(12) United States Patent
Miettinen

(10) Patent No.: US 8,397,304 B2
(45) Date of Patent: Mar. 12, 2013

(54) PRIVACY MANAGEMENT OF DATA

(75) Inventor: Markus Juhani Miettinen, Vantaa (FI)

(73) Assignee: Nokia Corporation, Espoo (FI)

( * ) Notice: Subject to any disclaimer, the term of this patent is extended or adjusted under 35 U.S.C. 154(b) by 155 days.

(21) Appl. No.: 12/988,510

(22) PCT Filed: Apr. 16, 2008

(86) PCT No.: PCT/FI2008/050196
§ 371 (c)(1),
(2), (4) Date: Nov. 12, 2010

(87) PCT Pub. No.: WO2009/127771
PCT Pub. Date: Oct. 22, 2009

(65) Prior Publication Data
US 2011/0289590 A1    Nov. 24, 2011

(51) Int. Cl.
*H04N 7/16* (2011.01)
(52) U.S. Cl. ......................................................... 726/26
(58) Field of Classification Search ..................... 726/26
See application file for complete search history.

(56) References Cited

U.S. PATENT DOCUMENTS

| | | |
|---|---|---|
| 6,618,721 B1 | 9/2003 | Lee |
| 2002/0169793 A1 | 11/2002 | Sweeney |
| 2003/0208457 A1 | 11/2003 | Iyengar |
| 2004/0049517 A1 | 3/2004 | Singh |
| 2006/0123461 A1 | 6/2006 | Lunt et al. |
| 2006/0123462 A1 | 6/2006 | Lunt et al. |
| 2008/0046276 A1 | 2/2008 | Hamilton et al. |

FOREIGN PATENT DOCUMENTS

| | | |
|---|---|---|
| CA | 2316743 A1 | 2/2002 |
| CA | 2345805 A1 | 11/2002 |
| WO | 02084531 A2 | 10/2002 |

OTHER PUBLICATIONS

Sweeney, "Achieving k-Anonymity Privacy Protection Using Generalization and Suppression", International Journal of Uncertainty, Fuzziness and Knowledge-Based Systems, 10 (5), 2002.

Agrawal et al, "Fast Discovery of Association Rules" Advances in knowledge discovery and data mining, pp. 307-328, American Association for Artificial Intelligence, Menlo Park, CA, USA, 1996. ISBN 0-262-56097-6.

International Search Report and Written Opinion of the International Searching Authority received in PCT Application No. PCT/FI2008/050196, dated Jan. 9, 2009, 18 pages.

Sweeney, "k-Anonymity: a model for protecting privacy", International Journal of Uncertainty, Fuzziness and Knowledge-Based Systems, 10 (5), 2002.

Samarati et al., Protecting Privacy when Disclosing Information: k-Anonymity and Its Enforcement through Generalization and Suppression, In Proceedings of the IEEE Symposium on Research in Security and Privacy 1998.

Ohno-Machado et al., "Protecting Patient Privacy by Quantifiable Control of Disclosures in Disseminated Databases", Intl. J. of Medical Informatics, 2004, 73 (7-8), pp. 559-606.

(Continued)

*Primary Examiner* — Jacob Lipman
(74) *Attorney, Agent, or Firm* — Harrington & Smith

(57) ABSTRACT

The invention relates to receiving data originating from multiple users, identifying data item combinations occurring within said data, determining privacy sensitivity measures to said data item combinations, and communicating privacy sensitivity measure(s) to user(s) concerned. The privacy sensitivity measures can be used to protect user privacy.

14 Claims, 7 Drawing Sheets

OTHER PUBLICATIONS

Duncan et al., "Microdata Disclosure Limitation in Statistical Databases: Query Size and Random Sample Query Control", In Proc. of the Symposium on Research in Security and Privacy, May 20-22, 1991, Symp. 12, Oakland, Los Alamitos, USA, IEEE Comp. Soc. Press., pp. 278-287.

Xu et al., "Location Anonymity in Continuous Location-Based Services", In Proceedings of the 15th Annual ACM International Symposium on Advances in Geographic Information Systems, Seattle, Washington, USA, New York, NY, USA, ACM, 2007, Article No. 39.

Castro, et al., "Better Bug Reporting with Better Privacy", ACM SIPOPS Operation Systems Review, 2008, 42(2), Mar. 2008, pp. 319-328.

PRIVACY MANAGEMENT OF DATA

RELATED APPLICATION

This application was originally filed as PCT Application No. PCT/FI2008/050196 filed Apr. 16, 2008.

FIELD OF THE INVENTION

The present invention generally relates to privacy management of data.

BACKGROUND OF THE INVENTION

Many new consumer services offered to users of mobile devices or internet users rely on the collection of user data from the users. These data can be used to personalize services or to offer content- or context-dependent services to the user. In order to receive services or to improve the perceived quality of the service, users are often required to submit personal information in electronic form to the other party, the other party meaning the service or another user. Revealing personal data, however, has privacy implications for the user. Privacy has been a hot topic, especially in social media applications like Facebook. In order to decide, whether the user is willing to reveal personal information, the user has to make a trade-off between three factors: trust, privacy risk and benefit.

A user's trust to the other party measures the level of confidence of the user that the other party will handle the user's information according to the declared or agreed upon policies. If a user's trust to a party is high, the user may be willing to reveal more and more sensitive data than if the level of trust would be low.

An existing solution for determining privacy risk concerning personal information has been introduced, e.g., in L. Sweeney. *k-Anonymity: a model for protecting privacy*. International Journal of Uncertainty, Fuzziness and Knowledge-Based Systems, 10 (7), 2002.

Also the prior art contains frequent itemset mining algorithms, such as Apriori, which has been introduced, e.g., in Rakesh Agrawal, Heikki Mannila, Ramakrishnan Srikant, Hannu Toivonen and A. Inkeri Verkamo "*Fast Discovery of Association Rules*" Advances in knowledge discovery and data mining, pp. 307-328, American Association for Artificial Intelligence, Menlo Park, Calif., USA, 1996. ISBN 0-262-56097-6.

The trustworthiness of the other party and the perceived benefits that come in exchange for revealing personal data have to be weighed against the privacy risks that come as a consequence of revealing user information. This is difficult since often the privacy risks related to user data are rather complex to understand and evaluate. Users tend also to underestimate the long-term privacy risks in favor of short-term benefits.

SUMMARY

According to a first aspect of the invention there is provided a method, comprising:
receiving data originating from multiple users;
identifying at least one data item combination occurring within said data;
determining a privacy sensitivity measure to each of said at least one data item combination; and
communicating the determined privacy sensitivity measures to users concerned.

In an embodiment, the data item combinations are combinations of data values that are identical in data records originating from a set of users. In an embodiment, said privacy sensitivity measure of a data item combination is based on the number of distinct users contributing to said data item combination.

In certain embodiments, said communicating determined privacy sensitivity measures to users concerned comprises:
transmitting privacy sensitivity measure(s) to user terminals, or
indicating to a user, by server software, a privacy sensitivity level formed based on said privacy sensitivity measure.

In certain embodiments, the method comprises:
identifying data item combinations, frequent itemsets, occurring within said data at least as many times as specified by a frequency threshold;
extracting a support set of each frequent itemset;
calculating the number of distinct users contributing to the support set; and
outputting the number of distinct users as the privacy sensitivity measure for the frequent itemset.

According to a second aspect of the invention there is provided an apparatus, comprising:
a processor configured for processing data originating from multiple users, the processor being further configured to perform an algorithm for identifying data item combinations occurring within said data and for determining privacy sensitivity measures to said data item combinations, the apparatus further comprising:
an interface configured for communicating privacy sensitivity measures to users concerned.

In certain embodiments, the apparatus is configured to determine the number of distinct users contributing to each data item combination.

In certain embodiment, said data originating from multiple users consist of personal user data.

According to a third aspect of the invention there is provided an apparatus, comprising:
a processor configured for collecting data intended for privacy sensitivity evaluation;
a communication interface module configured for transmitting said data to a measurement server and for receiving privacy sensitivity measure(s) determined by the measurement server based on said data, the apparatus being further configured to use the privacy sensitivity measure(s) to protect user privacy.

In certain embodiments, the apparatus comprises a privacy client configured for storing and maintaining privacy sensitivity measure values in a local storage.

In certain embodiments the apparatus is configured to receive privacy sensitivity measure values and to protect user privacy by customizing its behaviour using the received privacy sensitivity measure values.

In certain embodiments, the apparatus comprises a privacy client configured for giving privacy recommendations to applications residing in the apparatus.

In certain embodiments, the apparatus comprises a user interface component configured for indicating privacy sensitivity of data to a user.

According to a fourth aspect of the invention there is provided an apparatus, comprising:
means configured for processing data originating from multiple users, the means being further configured to perform an algorithm for identifying data item combinations occurring within said data and for determining privacy sensitivity measures to said data item combinations, the apparatus further comprising:

means configured for communicating privacy sensitivity measures to users concerned.

According to a fifth aspect of the invention there is provided an apparatus, comprising:

means configured for collecting data intended for privacy sensitivity evaluation;

means configured for transmitting said data to a measurement server and for receiving privacy sensitivity measure(s) determined by the measurement server based on said data, the apparatus being further configured to use the privacy sensitivity measure(s) to protect user privacy.

According to a sixth aspect of the invention there is provided computer readable medium having stored thereon a computer program executable in an apparatus, the computer program comprising:

program code for processing data originating from multiple users, and for performing an algorithm for identifying data item combinations occurring within said data and for determining privacy sensitivity measures to said data item combinations; and program code for controlling an interface for communicating privacy sensitivity measures to users concerned.

According to a seventh aspect of the invention there is provided computer readable medium having stored thereon a computer program executable in an apparatus, the computer program comprising:

program code for collecting data intended for privacy sensitivity evaluation;

program code for controlling a communication interface module for transmitting said data to a measurement server and for receiving privacy sensitivity measure(s) determined by the measurement server based on said data; and program code for using the privacy sensitivity measure(s) to protect user privacy.

In an embodiment, information is gathered from multiple users and then analyzed to come up with privacy sensitivity values relating to that data. The privacy sensitivity values may then be transmitted back to user devices where those can be used to protect the user's data.

Embodiments of the invention provide for an automated way for evaluating the privacy sensitivity of certain data. The evaluated privacy sensitivity of the data can be sent to the user device and/or indicated to the user. In certain embodiments, the evaluated privacy sensitivity is sent only to selected user devices, for example, to those devices which the evaluated privacy sensitivity concerns. The data may be user data characterizing the user, especially the user data may be user data of a mobile device.

Various exemplary embodiments of the present invention are illustrated hereinafter in the detailed description of the invention as well as in the dependent claims appended hereto. The embodiments are illustrated with reference to selected aspects of the invention. A person skilled in the art appreciates that any embodiment of the invention may be combined with other embodiment(s) within the same aspect. Furthermore, any embodiment may apply to other aspects as well either alone or in combination with other embodiment(s).

BRIEF DESCRIPTION OF THE DRAWINGS

The invention will now be described, by way of example only, with reference to the accompanying drawings, in which.

DETAILED DESCRIPTION

In certain embodiments, user data collected from multiple users is analysed and privacy sensitivity measures are assigned to different user data item combinations. In an embodiment, each data item combination has a specific privacy sensitivity measure applicable to that data item combination. The privacy sensitivity measures of different data item combinations may or may not be the same, depending on the data. The sensitivity measure can be a measure for how unique a specific data combination is for the analysed set of users. The sensitivity measure may be related to the notion of k-anonymity. In an embodiment, the privacy sensitivity measure tells how indistinguishable a set of user data items is from the user data items of other users. The privacy sensitivity measures can be used, for example, by the user's local system to customise the appearance of privacy-critical data on a user interface, and can warn the user if he/she is performing actions that involve privacy-critical data items.

Figure 1:
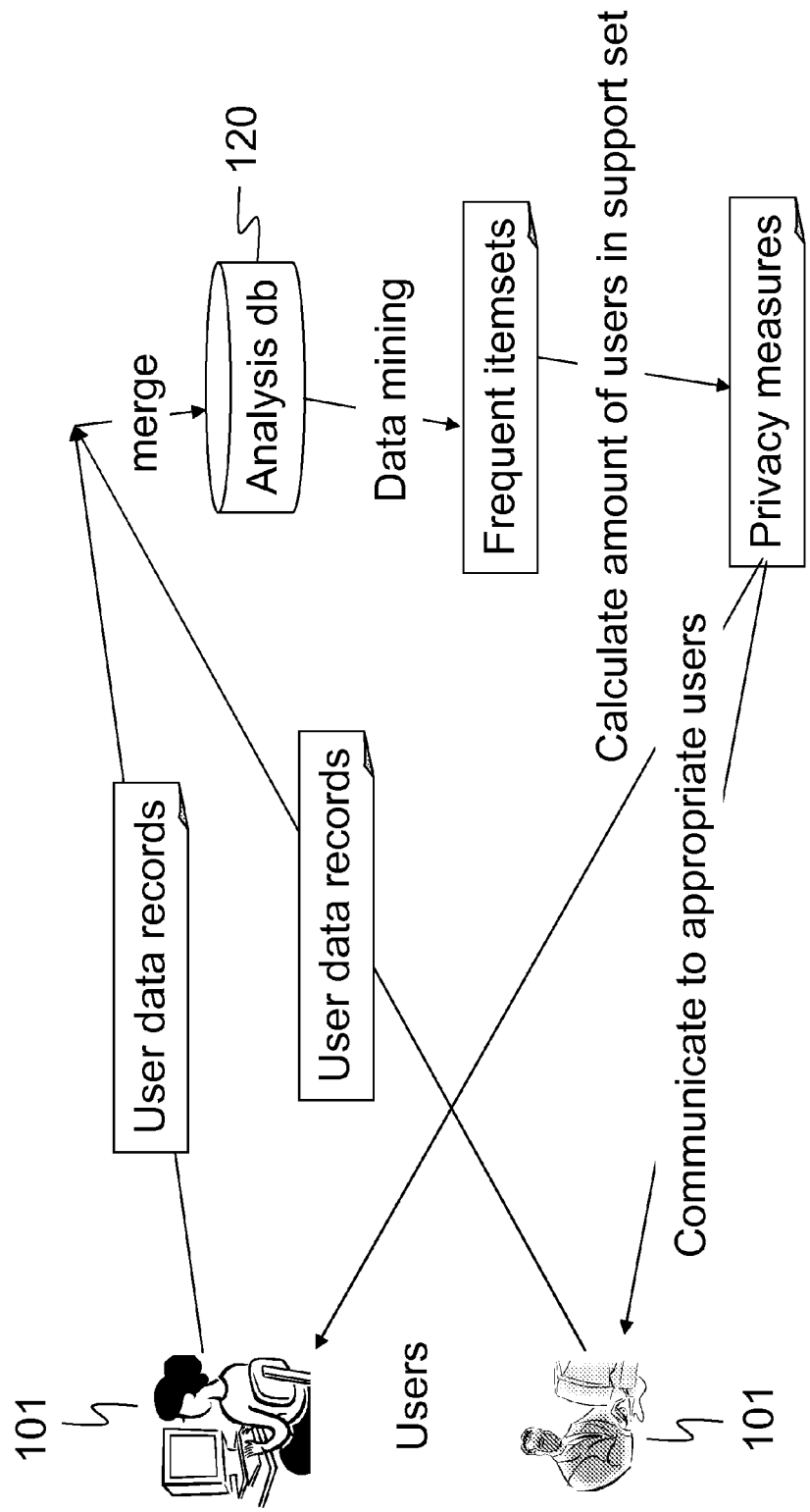
FIG. 1 shows a functionality in certain embodiments.

The following four steps can be identified in an exemplary embodiment as illustrated in FIG. 1:

In the first step, user data records are collected from users 101. These records are merged into a database (Analysis db) 120.

In the second step, the database is input into a data mining algorithm for identifying frequent itemsets in the data. Frequent itemsets are combinations of data items which co-occur in data records at least as many times as specified by a frequency threshold parameter.

In the third step, the found frequent itemsets are analysed further. The support set of each frequent itemset is extracted and the number of distinct users contributing to the support set is calculated. The number of distinct users is then output as a privacy sensitivity measure for the frequent itemset.

In a fourth step, the frequent itemsets and their associated privacy sensitivity measures are communicated to appropriate users contributing to the support set of the said frequent itemset.

A privacy sensitivity measure value m obtained for a set of data items expresses the fact that the specific combination of data items is shared with at least m other users. It is therefore a measure for how common the combination of data items is in the user population. If the privacy sensitivity measure value is high, it means that the data items are shared by lots of other users and therefore the uniqueness of the data is low. This means that the data in question can not easily be used to reveal private details about the user, or to specifically identify the user. A high absolute privacy sensitivity measure value would therefore suggest that the privacy risk associated with the specific set of user data items would be low.

After the fourth step, each user has a privacy sensitivity measure for data items and data item combinations which occur frequently in the user population's user data. Data items and data item combinations for which no privacy sensitivity measure was provided occur only seldom and are therefore to be regarded as 'sensitive' from a privacy point of view. For data items and data item combinations with an associated privacy sensitivity measure value, the measure can be used to classify the user data. The user interface and user applications can utilise the privacy sensitivity measure values of data items and data item combinations for guiding the user to more privacy-preserving behaviour and customising the appearance of the graphical user interface in a way that makes it easier for the user to evaluate the sensitivity of specific user data items.

Figure 2:
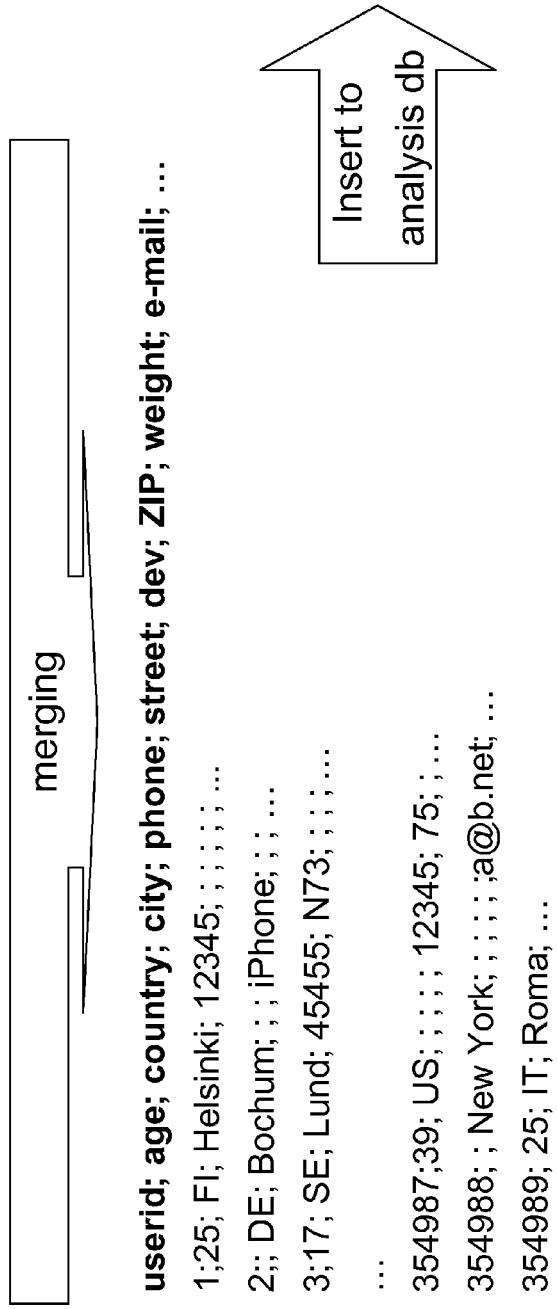
FIG. 2 shows how different kinds of user data records are merged into an analysis database in certain embodiments.

FIG. 2 illustrates the merging step in more detail. It shows how different kinds of user data records are merged into the analysis database 120. The collected user data records comprise various data items. For example a user data record collected from user C comprises the data items of "age: 17", "country: SE", "city: Lund", "phone: 45455", "dev: N73", etc. . . . , meaning that his/her age is 17, the country in which he/she lives is Sweden, the city he/she lives in is Lund, the phone number he/she has is 45455 and the device he/she is using is Nokia N73.

The user data records of all users A-Z can be organised by merging the user data records having different data items into a single logical structure as illustrated in FIG. 2. Each user has been assigned a user identifier (userid). For example user C has been assigned a user identifier "3" in this example. The user data records can, in an embodiment, follow the corresponding user identifiers to form rows so that if a certain data item is missing from a user data record, this data item (or its value) can be left empty in the row. For example, in the example shown in FIG. 2, the data items "age", "phone", and "street" of user B (userid: 2) have, among other things, been left empty. If more than one user data record is collected from the same user, each such a record can be processed for the merging purpose separately as if the records were collected from different users. In the example shown in FIG. 2 this would result in two or more rows having the same user identifier. The merged data is then inserted to the database 120.

Figure 3:
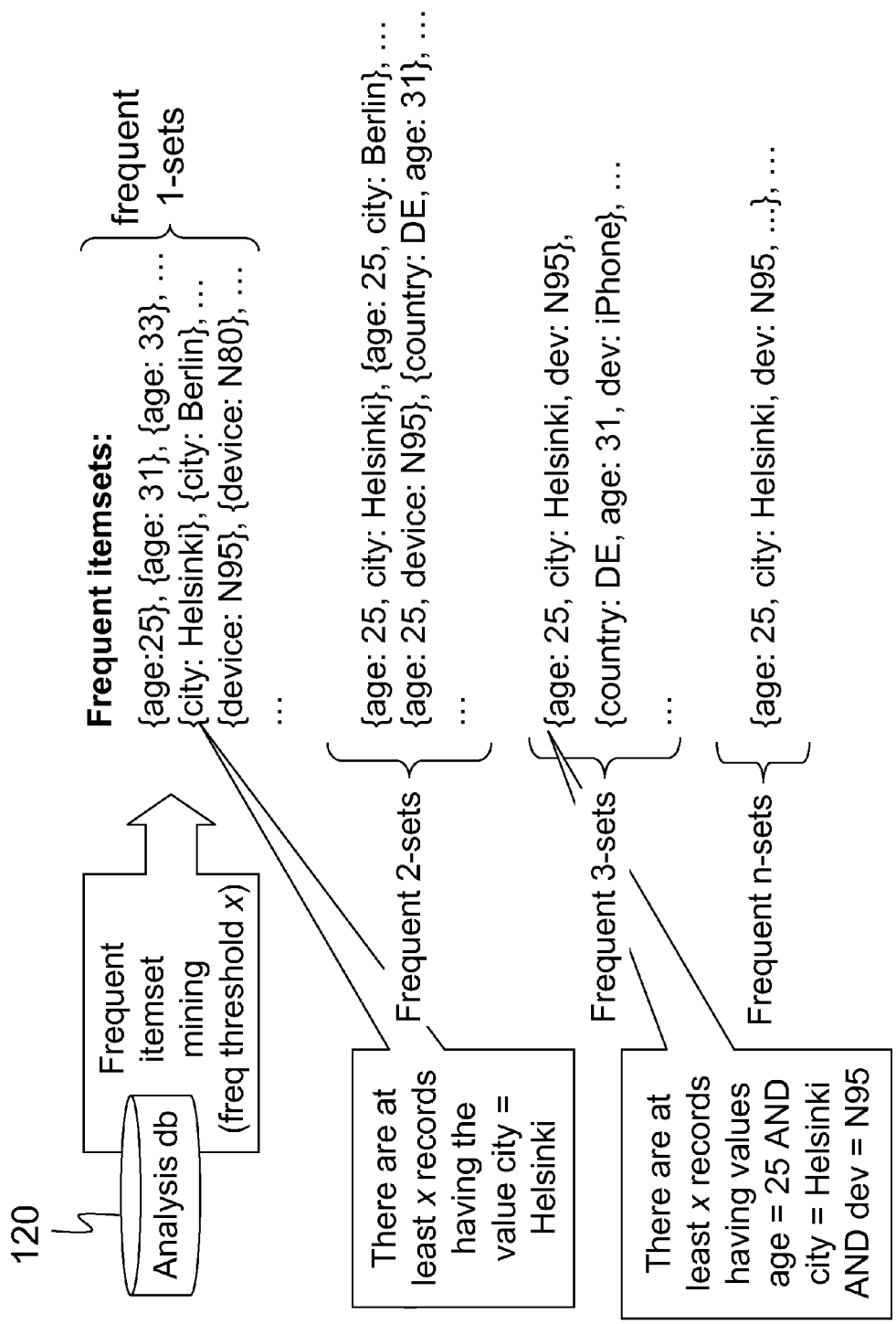
FIG. 3 shows an example of data mining results on an example database.

FIG. 3 shows an example of data mining results on an example database. As mentioned in the preceding, the data in database 120 can be input into a data mining algorithm for identifying frequent itemsets in the data. In the example of FIG. 3, the frequency threshold parameter is denoted by x. The data mining algorithm determines such combinations of data items, frequent itemsets, that occur in the data more often than a predefined threshold x. Frequent 1-sets, 2-sets, 3-sets, . . . , and n-sets occurring more often than x times are obtained as a result as illustrated in FIG. 3.

Figure 4:
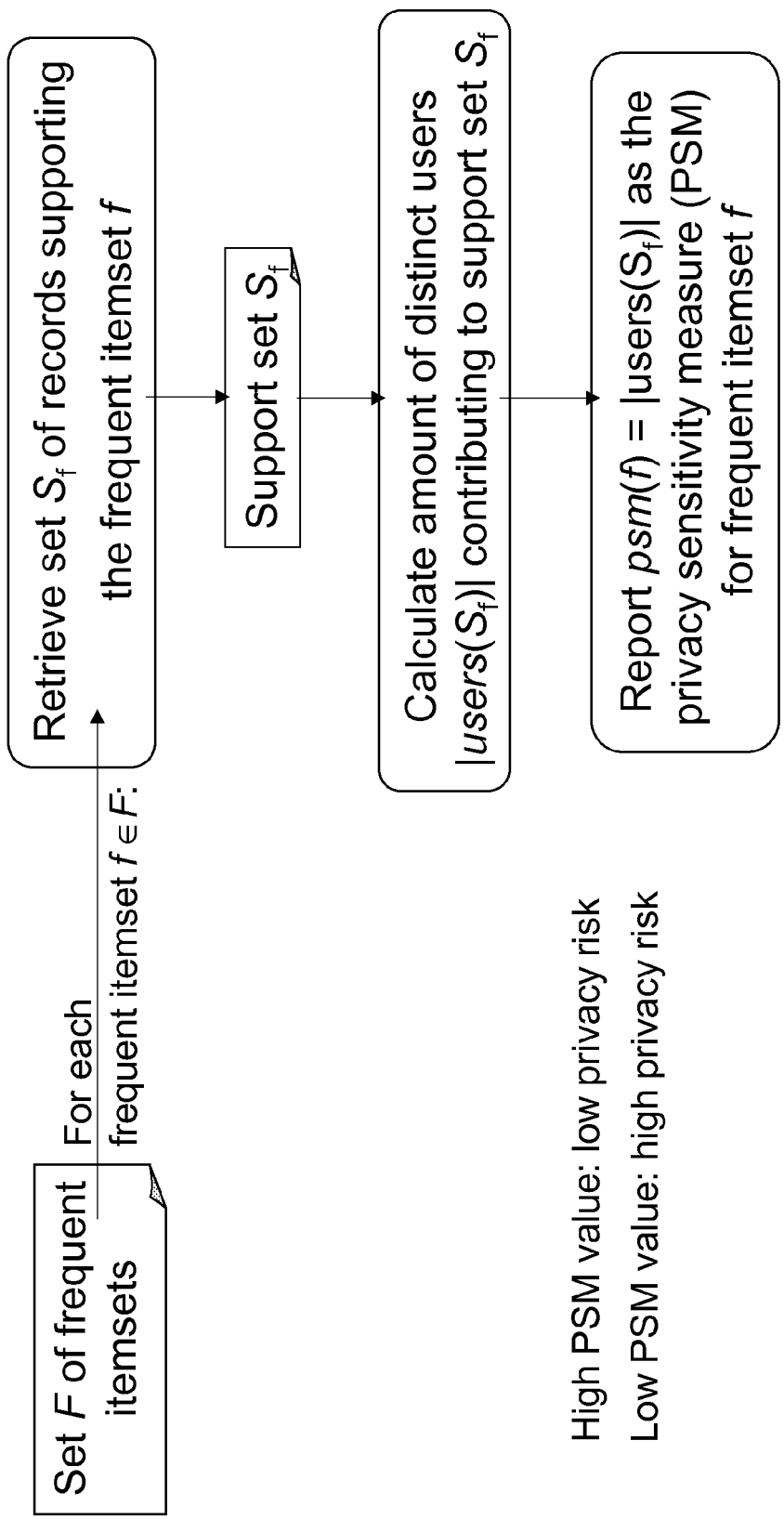
FIG. 4 shows a process of calculating privacy sensitivity measure values in certain embodiments.

FIG. 4 describes an example of the process of calculating privacy sensitivity measures. It is assumed that the set of frequent itemsets found in the preceding data mining phase is F. Subsequently a set of records supporting each frequent itemset f is determined to form a support set $S_f$ for each frequent itemset f. The number of distinct users $|users(S_f)|$ contributing to each support set $S_f$ is calculated. The number of distinct users is then output as a privacy sensitivity measure psm(f) for the frequent itemset f. The higher the psm(f) is the lower is the privacy risk and vice versa. In other words, the privacy sensitivity measure in this example is inversely proportional to the privacy risk.

For the purpose of calculating the number of distinct user it may be appropriate to map beforehand, for example in the merging stage, the user identifiers (FIG. 2) with an address of the user or user device, such as a phone number or network address.

Figure 5:
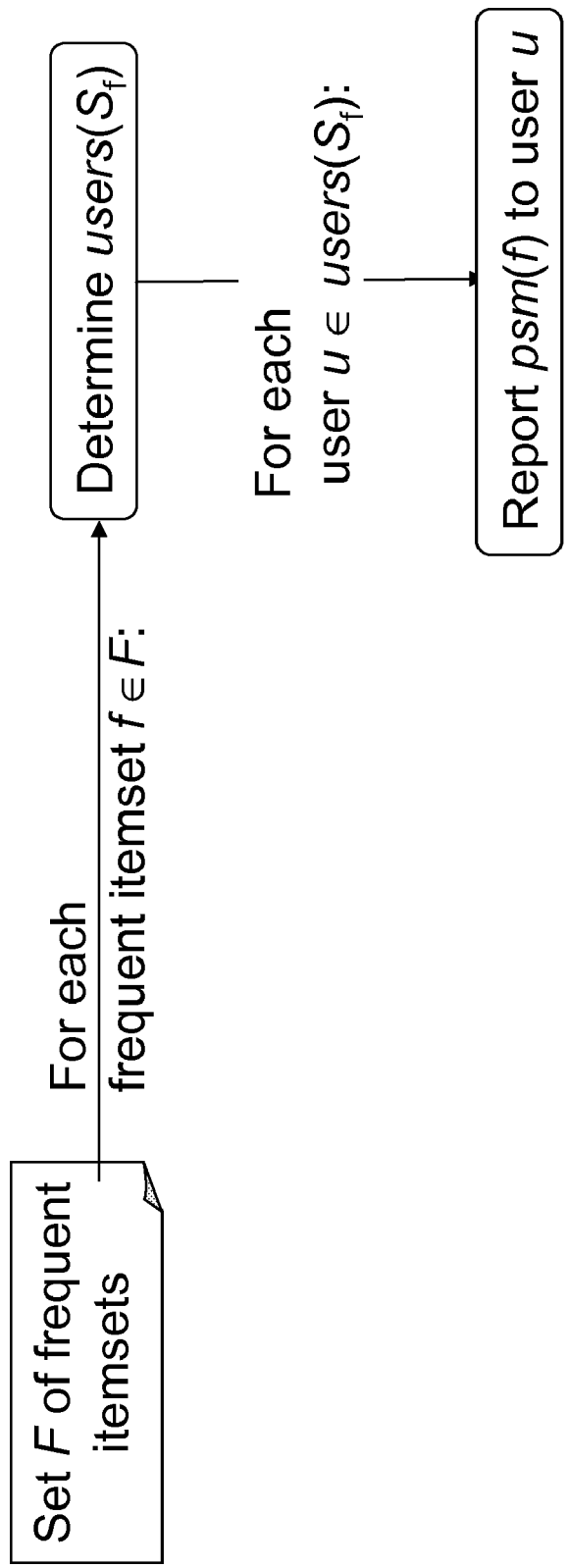
FIG. 5 shows a process of communicating privacy sensitivity measure results to appropriate users in certain embodiments.

FIG. 5 describes the process of communicating privacy sensitivity measure results to appropriate users. The set of users ($users(S_f)$) contributing to each support set $S_f$ of the frequent itemsets f are first determined. Subsequently the privacy sensitivity measure value psm(f) associated with each frequent itemset f is communicated to each user u contributing to each support set $S_f$ in question.

Figure 6:
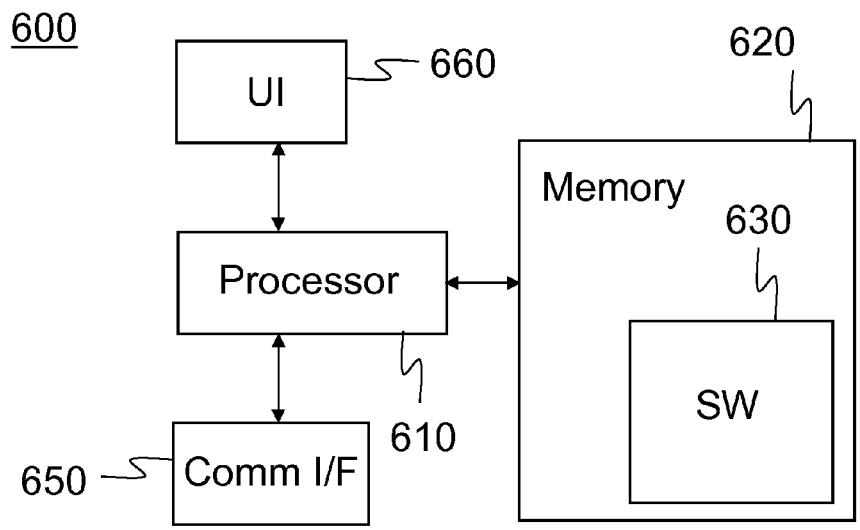
FIG. 6 shows a block diagram of a user device in accordance with certain embodiments.

FIG. 6 presents an example block diagram of a user's local system or apparatus 600. This may be a user device or apparatus, such as a mobile terminal.

The general structure of the apparatus 600 comprises a communication interface module 650, a processor 610 coupled to the communication interface module 650, and a memory 620 coupled to the processor 610. The apparatus further comprises software 630 stored in the memory 620 and operable to be loaded into and executed in the processor 610. The software 630 may comprise one or more software modules and can be in the form of a computer program product. The apparatus 600 further comprise a user interface controller 660 coupled to the processor 610.

The communication interface module 650 may be, e.g., a radio interface module, such as a WLAN, Bluetooth, GSM/GPRS, CDMA, or WCDMA radio module, or a wireline interface module, such as a LAN interface module. The communication interface module 650 may be integrated into the apparatus 600 or into an adapter, card or the like that may be inserted into a suitable slot or port of the apparatus 600. The communication interface module 650 may support one radio or wired interface technology or a plurality of technologies. FIG. 6 shows one communication interface module 650, but the apparatus 600 may comprise a plurality of communication interface modules 650.

The processor 610 may be, e.g., a central processing unit (CPU), a microprocessor, a digital signal processor (DSP), a graphics processing unit, or the like. FIG. 6 shows one processor 610, but the apparatus 600 may comprise a plurality of processors.

The memory 620 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 600 may comprise a plurality of memories. The memory 620 may be constructed as a part of the apparatus 600 or it may be inserted into a slot, port, or the like of the apparatus 600 by a user. The memory 620 may serve the sole purpose of storing data, or it may be constructed as a part of an apparatus serving other purposes, such as processing data.

The user interface controller 660 may comprise circuitry for receiving input from a user of the apparatus 600, e.g., via a keyboard, graphical user interface shown on the display of the apparatus 600, speech recognition circuitry, or an accessory device, such as a headset, and for providing output to the user via, e.g., a graphical user interface or a loudspeaker.

A skilled person appreciates that in addition to the elements shown in FIG. 6, the apparatus 600 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like.

Figure 7:
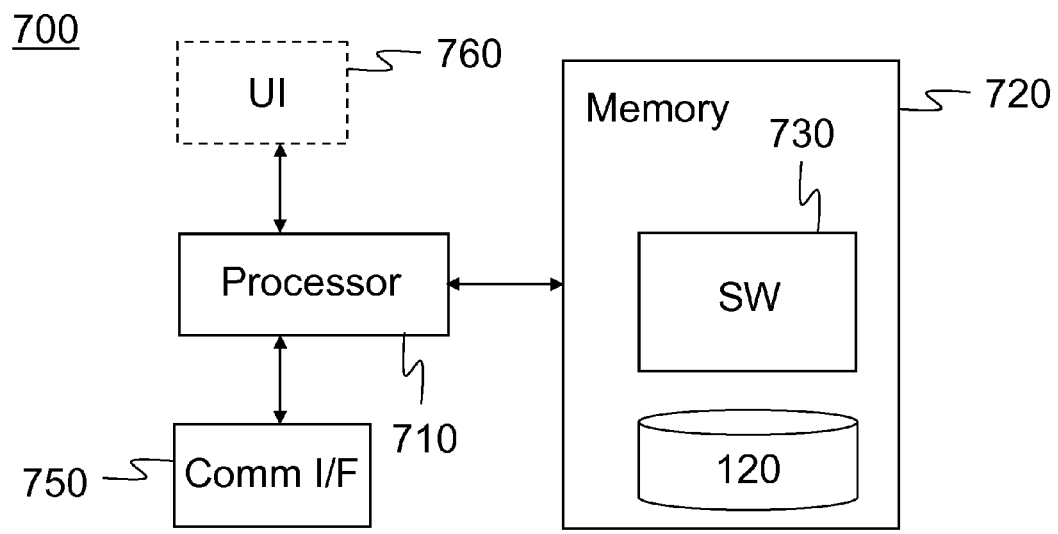
FIG. 7 shows a block diagram of a measurement server in accordance with certain embodiments.

FIG. 7 presents an example block diagram of an apparatus 700, e.g., a measurement server or similar. This may be, e.g., a server apparatus in a communications network.

The general structure of the apparatus 700 comprises a communication interface module 750, a processor 710 coupled to the communication interface module 750, and a memory 720 coupled to the processor 710. The apparatus further comprises software 730 stored in the memory 720 and operable to be loaded into and executed in the processor 710. The software 730 may comprise one or more software modules and/or applications and it can be in the form of a computer program product. The apparatus further comprises a data storage or said database 120 mentioned in the preceding for storing merged data records. The apparatus 700 may further comprise a user interface controller 760 coupled to the processor 710.

The communication interface module 750 may be, e.g., a radio interface module, such as a WLAN, Bluetooth, GSM/GPRS, CDMA, or WCDMA radio module, or a wireline interface module, such as a LAN interface module, or the like. The communication interface module 750 may be integrated into the apparatus 700 or into an adapter, card or the like that may be inserted into a suitable slot or port of the apparatus 700. The communication interface module 750 may support one radio or wired interface technology or a plurality of technologies. FIG. 7 shows one communication interface module 750, but the apparatus 700 may comprise a plurality of communication interface modules 750.

The processor 710 may be, e.g., a central processing unit (CPU), a microprocessor, a digital signal processor (DSP), a graphics processing unit, or the like. FIG. 7 shows one processor 710, but the apparatus 700 may comprise a plurality of processors.

The memory 720 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 700 may comprise a plurality of memories. The memory 720 may be constructed as a part of the apparatus 700 or it may be inserted into a slot, port, or the like of the apparatus 700 by a user. The memory 720 may serve the sole purpose of storing data, or it may be constructed as a part of an apparatus serving other purposes, such as processing data.

The user interface controller 760 may comprise circuitry for receiving input from and output to a user of the apparatus 700. A skilled person appreciates that in addition to the elements shown in FIG. 7, the apparatus 700 may comprise other elements.

In certain embodiments, the apparatus 700 (referred herein to as the privacy measurement server 700) receives user data records via the communication interface module 750 over a wired or wireless connection (e.g, from a set of apparatuses 600) and merges them into the analysis database 120. The merging can be implemented by a data collector software module comprised in the memory 720. For determining privacy sensitivity measures, the privacy measurement server 700 executes a data mining analysis on the analysis database 120. The data mining analysis can be implemented, e.g., by a data mining software module comprised in the memory 720. The privacy measurement server 700 applies a frequent itemset mining algorithm like, e.g., Apriori on the data and determines such combinations of data items that occur in the data more often than a predefined threshold. For each found frequent itemset, the support set, i.e., the set of records that contain the itemset, is extracted from the analysis database 120. Then, the amount of distinct users in the support set is counted and is defined to be the privacy sensitivity measure value for that frequent itemset. This counting and defining can be implemented, e.g., by a privacy sensitivity measure software module comprised in the memory 720.

After the privacy sensitivity measure value for a frequent itemset has been determined, the privacy measurement server 700, in an embodiment, sends a notification of the frequent itemset and its privacy sensitivity measure value to each of the users (or their apparatuses 600) who contributed records to the support set of the frequent itemset. This notification is sent via the communication interface module 750.

Figure 8:
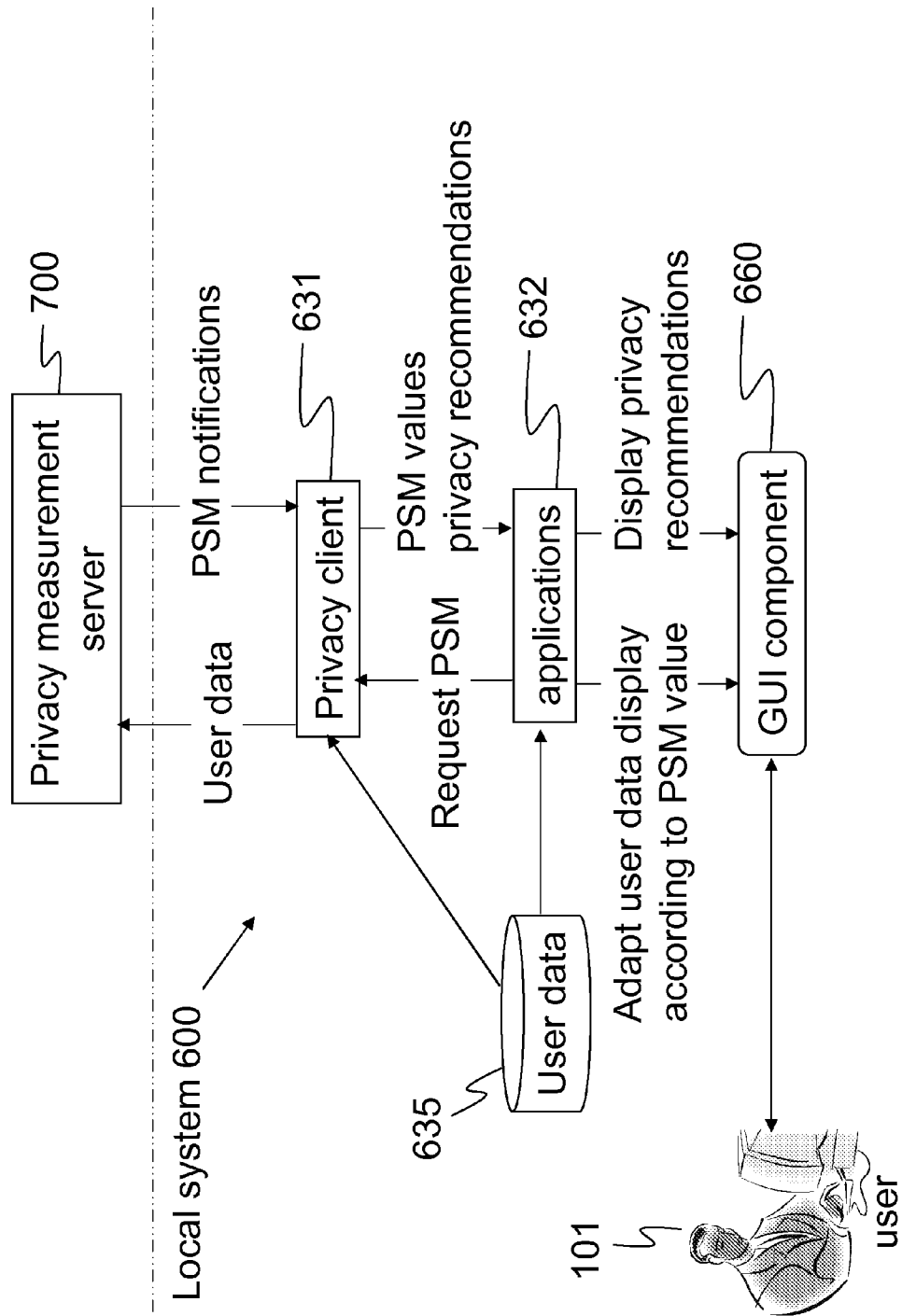
FIG. 8 shows an example of incorporating a privacy sensitivity measure client into a user's local system in an embodiment.

FIG. 8 shows an example of incorporating a privacy sensitivity measure client into a user's local system in an embodiment. The user's local system 600 comprises a privacy client application 631 which can be contained within the software 630 in memory 620 (FIG. 6). A corresponding client application 631 can be contained in each device of the same user and in devices of different users. The privacy measurement server 700 provides for a (trusted) service for determining privacy sensitivity measure (PSM) values.

Each client application 631 extracts user data records 635 from the local apparatus/system 600 and selects such itemsets (or attributes) which are to be privacy evaluated. It then sends records containing these attributes to the trusted privacy measurement server 700 through a protected channel. The sending can be effected via the communication interface module 650 (FIG. 6).

After the privacy sensitivity measure value(s) for the desired itemsets has been determined by the privacy measurement server 700, the privacy measurement server 700 sends a notification containing said value(s) to the client application 631. The client application 631 receives the value in said notification via the communication interface module 650 and keeps record of the received privacy sensitivity measure values. For example, the client application 631 can store and maintain the privacy sensitivity measure values in a local register, local database or in a similar data storage.

The privacy sensitivity measure values can be used to customise the behaviour of the user's local system 600. The client application 631 can respond with a PSM value to privacy sensitivity measure requests received from other applications 632 (e.g., user applications) in the apparatus. It can give privacy recommendations to said other applications 632 based on rules set beforehand. These rules may be fixed rules in the application or they may be set, e.g., by the user. An example of a rule set by the user may be that the user desires to be indistinguishable from at least a certain number (e.g., 500) of other user. For example, an application 632 may ask the privacy sensitivity of a certain data item combination and receive the following privacy recommendation from the privacy client application 631: "If the fourth data item is left out then the combination of the first three data items has a high enough PSM value".

In an embodiment, when the user 101 is submitting user data to be sent over network, the user interface 660 (or graphical user interface component 660) indicates the privacy sensitivity of the data in question. For example, a dialog window (e.g., pop-up window) requesting user acknowledgement for the submission could include a graphical or verbal warning if the privacy sensitivity measure value for the submitted data lies below a specified threshold. Alternatively, if the privacy sensitivity measure values for data involved in a transaction lie above a specified level, no acknowledgement could be requested at all and transactions could proceed without prompting the user, thus improving the user experience.

The presented embodiments provide a straightforward way to automatically evaluate the sensitivity of data from a privacy point of view. Embodiments of the invention can be incorporated in any environment, in which there is a pool of users sharing data.

Certain embodiments concern pure server functionality. In these embodiments, the server which provides a service, e.g., a social networking service, such as Facebook or LinkedIn, obtains user data records from a data storage or memory that is integrated to or in connection with the server, performs the data mining analysis as presented in the preceding and determines privacy sensitivity measure values as presented in the preceding. However, instead of actually sending privacy sensitivity measure values to selected users or user devices, the server software in an embodiment only indicates to the user the level of privacy sensitivity of an itemset (formed based on said privacy sensitivity measure, e.g., by the server software) in question at each time in question. The user can see this indication (e.g., privacy sensitivity level: high/moderate/low etc.) by his/her web browser or another client application residing in a user apparatus.

An embodiment integrated into a social networking environment enable the service itself (e.g., Facebook or similar) to provide privacy recommendations to the user when the user is posting information about himself/herself to the service. For example, the service could warn the user with warnings similar as this "You are about to publish following information about yourself: <address> <city> <zip-code>. This information is with high likelihood unique for you and might have privacy implications for you. Do you want to proceed?" The privacy sensitivity measures could also be used to give automatic privacy advice to the user in cases like the above example. The system could offer optional privacy improvements by suggesting to publish similar data records but which have a lower privacy risk. The system could recommend, e.g. "If you publish only the items <city> <zip-code>, you will have at least 123 other users sharing the same information. Do you want to publish only these items, instead?"

The privacy sensitivity measure can be regarded as a practical and easily understandable measure that can be used by the user's local system to evaluate the practical privacy sensitivity of user information. By using it one can create a measure of privacy in a large variety of usage scenarios.

Embodiments of the invention are flexible in what comes to the actual data that are analysed. The attributes and their content do not have to be specified beforehand. When new applications emerge in the user base and thereby new data attributes about the users appear, these can be added to the analysis on-the-fly. A common naming or mapping scheme for the user data attributes can be used. The flexibility of the system also means that not all users have to provide exactly the same information for analysis. It is sufficient that a user submits only those data items for analysis, which she potentially wants to publish or share.

In embodiments of the invention a trusted party (e.g., a privacy measurement server) performs the data mining analysis. The trusted party has therefore access to all user data. This might in some cases be undesirable. Additional security can be provided by hashing all attribute values using a suitable algorithm before submitting them to the trusted party. The trusted party can therefore only learn the hashed attribute values, not the original data values.

The uses of presented embodiments are not limited to explicit personal data entered by the user, but the term user data herein also contains any other kind of data which can be collected from users or user devices. The presented embodiments can be applied to various other kinds of user data scenarios, such as device-specific or user-specific behavioural data or information that is automatically collected by a local system (e.g., a mobile device) and sent to a trusted party for analysis. For example, browsing traces, location patterns and application usage patterns can be included in the privacy sensitivity analysis.

Various embodiments have been presented. It should be appreciated that in this document, words comprise, include and contain are each used as open-ended expressions with no intended exclusivity.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means without deviating from the characteristics of the invention.

Furthermore, some of the features of the above-disclosed embodiments of this invention may be used to advantage without the corresponding use of other features. As such, the foregoing description should be considered as merely illustrative of the principles of the present invention, and not in limitation thereof. Hence, the scope of the invention is only restricted by the appended patent claims.

The invention claimed is:

1. A method, comprising:
receiving data originating from multiple users;
identifying at least one data item combination occurring within said data;
determining a privacy sensitivity measure of said at least one data item combination; and
communicating the determined privacy sensitivity measure to users submitting data having said at least one data item combination,
wherein the method further comprises:
identifying at least one data item combination occurring within said data at least as many times as specified by a frequency threshold, said at least one data item combination being a frequent itemset;
extracting a support set for said frequent itemset;
calculating the number of distinct users contributing to the support set; and
outputting the number of distinct users as the privacy sensitivity measure for said frequent itemset.

2. The method of claim 1, wherein said determining a privacy sensitivity measure comprises:
determining the number of distinct users submitting data having said at least one data item combination.

3. The method of claim 1, wherein said communicating the determined privacy sensitivity measure to users submitting data having said at least one data item combination comprises:
transmitting the privacy sensitivity measure to user terminals, or
indicating to a user, by server software, a privacy sensitivity level formed based on said privacy sensitivity measure.

4. The method of claim 1, wherein said data originating from multiple users comprises personal user data.

5. An apparatus, comprising:
a processor configured to process data originating from multiple users, the processor being further configured to perform an algorithm for identifying at least one data item combination occurring within said data and to determine a privacy sensitivity measure of said at least one data item combination, the apparatus further comprising:

an interface configured for communicating the determined privacy sensitivity measure to users submitting data having said at least one data item combination, wherein the apparatus is further configured to:

identify at least one data item combination occurring within said data at least as many times as specified by a frequency threshold, said at least one data item combination being a frequent itemset;

extract a support set for said frequent itemset;

calculate the number of distinct users contributing to the support set; and output the number of distinct users as the privacy sensitivity measure for said frequent itemset.

6. The apparatus of claim 5, wherein the apparatus is further configured to determine the number of distinct users submitting data having said at least one data item combination.

7. The apparatus of claim 5, wherein the apparatus is configured to implement communicating the determined the privacy sensitivity measure to users submitting data having said at least one data item combination by:

transmitting the privacy sensitivity measure to user terminals, or indicating to a user, by server software, a privacy level formed based on said privacy sensitivity measure.

8. The apparatus of claim 5, wherein said data originating from multiple users comprises personal user data.

9. An apparatus, comprising:

a processor configured to collect data intended for privacy sensitivity evaluation;

a communication interface module configured to transmit said data to a measurement server and for receiving a privacy sensitivity measure determined by the measurement server based on said data, the apparatus being further configured to use the privacy sensitivity measure to protect user privacy, wherein the measurement server:

identifies at least one data item combination occurring within said data at least as many times as specified by a frequency threshold, said at least one data item combination being a frequent itemset;

extracts a support set for said frequent itemset;

calculates the number of distinct users contributing to the support set; and outputs the number of distinct users as the privacy sensitivity measure for said frequent itemset.

10. The apparatus of claim 9, further comprising:

a privacy client configured to store and maintain privacy sensitivity measure values in a local storage.

11. The apparatus of claim 9, wherein the apparatus is further configured to receive privacy sensitivity measure values and to protect user privacy by customizing its behavior using the received privacy sensitivity measure values.

12. The apparatus of claim 9, further comprising:

a privacy client configured to give privacy recommendations to applications residing in the apparatus.

13. The apparatus of claim 9, further comprising:

a user interface component configured to indicate privacy sensitivity of data to a user.

14. A non-transitory computer readable medium having stored thereon a computer program executable in an apparatus, the computer program comprising:

program code to process data originating from multiple users, and to perform an algorithm for identifying at least one data item combination occurring within said data and to determine a privacy sensitivity measure of said at least one data item combination; and program code to control an interface for communicating the determined privacy sensitivity measure to users submitting data having said at least one data item combination, wherein the computer code further comprises:

program code to identify at least one data item combination occurring within said data at least as many times as specified by a frequency threshold, said at least one data item combination being a frequent itemset;

program code to extract a support set for said frequent itemset;

program code to calculate the number of distinct users contributing to the support set; and program code to output the number of distinct users as the privacy sensitivity measure for said frequent itemset.

* * * * *